(No Model.)

W. A. WHITE.
BLANCHER FOR CELERY, &c.

No. 459,804. Patented Sept. 22, 1891.

WITNESSES:
H. F. Parker
M. J. Spencer.

INVENTOR
Wm. A. White
BY
H. S. Hoyt Jr.
ATTORNEY

UNITED STATES PATENT OFFICE.

WILLIAM A. WHITE, OF STAATSBURG, NEW YORK.

BLANCHER FOR CELERY, &c.

SPECIFICATION forming part of Letters Patent No. 459,804, dated September 22, 1891.

Application filed March 5, 1891. Serial No. 383,874. (No model.)

*To all whom it may concern:*

Be it known that I, WILLIAM A. WHITE, a citizen of the United States, residing at Staatsburg, in the county of Dutchess and State of New York, have invented a new and useful Improvement in Blanchers, of which the following is a specification.

My invention relates to an improvement in blanchers and is used in blanching or bleaching celery, but which may be used in blanching any plants for which it is suitable; and the objects of my improvements are to allow of a great number of rows of such plants being grown in a small space and to save labor and expense. I attain these objects by my improvements shown in the accompanying drawings.

Similar letters refer to similar parts throughout the several views.

Figure 1:
Figure 2:
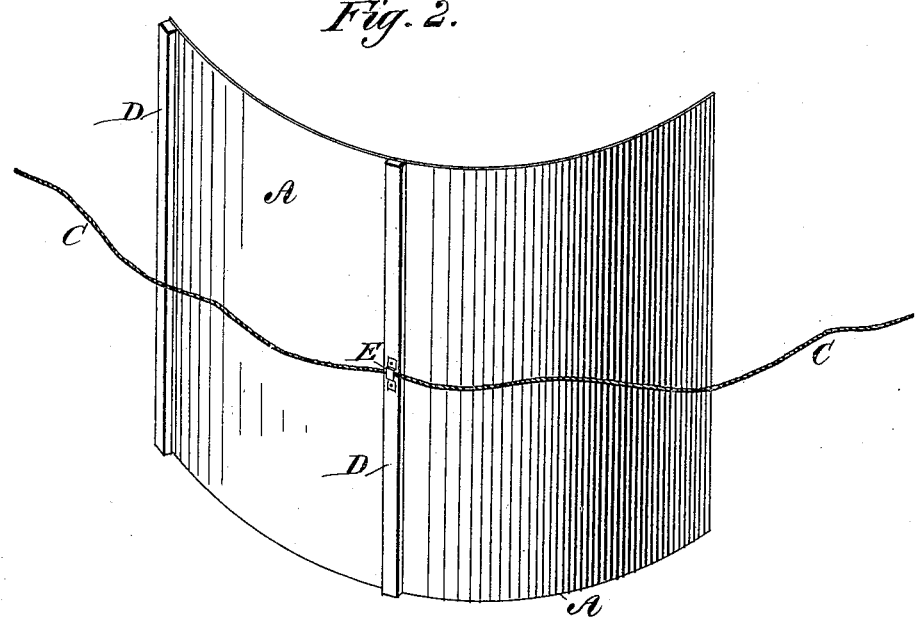

Figure 1 represents celery-plants growing with and without my improvement wrapped about them. Fig. 2 represents my improvement.

A is a flexible wrapper.

B is a celery-plant.

C is a cord for tying or holding the wrapper tightly around the plant.

D is a stiffening-brace for A.

E is a clamp for holding C in place.

It is seen that my improvement consists of a flexible wrapper, one for each plant, with devices for holding it tightly in shape and place when it is wrapped around a plant.

I find it preferable to make the wrapper of a stout paper—almost any cheap lining-paper or cloth or muslin or other soft material will do—and to use two wooden stiffening-braces, one in the middle of the wrapper and the other at one end, the free end being inside when the wrapper is in use, so that it may be wrapped the more tightly around the plant. The braces may be tacked to the wrapper and tin washers used to prevent the paper tearing, and I find it preferable to hold the wrapper tightly around the plant by a cord, which is prevented from slipping by a clamp on one of the braces.

I am aware that there have been issued patents for celery-bleachers consisting of continuous rolls, which I do not claim, and also a patent for a wooden wrapper for the protection of trees or plants from certain injuries, which uses I do not claim; and I do not wish to limit myself to any particular materials for my improvement, except that the wrapper may not be made of any hard substance which would injure the tender celery-stems.

For the stiffening-brace D, the tying-cord C, and clamp E their equivalents may be used.

What I claim as my invention, and desire to secure by Letters Patent, is—

A celery-blancher consisting of a flexible wrapper, with stiffening-braces on the wrapper and outside of it, a tying-cord passing outside and around the wrapper and the braces, and a clamp to hold the tying-cord in place, substantially as described, and for the purpose specified.

WILLIAM A. WHITE.

Witnesses:
FRED E. ACKERMAN,
THEO. A. HOFFMAN.